United States Patent [19]

Incorvaia et al.

[11] Patent Number: 5,247,280
[45] Date of Patent: Sep. 21, 1993

[54] COMBINATION VEHICLE FLASHER HAVING FIRST AND SECOND FLASH RATES AND DUTY RATES

[75] Inventors: Michael D. Incorvaia, Timothy W. Brooks; both of Kodak, Tenn.

[73] Assignee: Cooper Industries, Inc., Houston, Tex.

[21] Appl. No.: 739,039

[22] Filed: Aug. 1, 1991

[51] Int. Cl.$^5$ ............................................ B60Q 11/00
[52] U.S. Cl. .................................. 340/458; 340/471; 340/463; 340/475; 340/642
[58] Field of Search ............... 340/471, 458, 463, 464, 340/642, 475, 641; 307/10.1, 10.8

[56] References Cited

U.S. PATENT DOCUMENTS 4,684,819  8/1987  Haag .................................. 340/458
5,072,210  12/1991 Kimmelman ..................... 340/471

FOREIGN PATENT DOCUMENTS 8703548  12/1986  World Int. Prop. O. ........... 340/475

Primary Examiner—Jin F. Ng
Assistant Examiner—Christine K. Oda
Attorney, Agent, or Firm—Eddie E. Scott; William B. Patterson; Alan R. Thiele

[57] ABSTRACT

An integrated circuit is utilized to control a switch so the flash rate and duty cycle of a flasher system is accurately regulated. The tighter control allows two flash rate and duty cycle combinations whereby a driver perceives a significant difference between the two settings, normal operation and lamp out operation. Such a feature allows one flasher to meet all Federal Motor Vehicle Safety Standards when used as a combination flasher for a 3-lamp turn signal and a 6-lamp hazard warning lighting system in vehicles.

5 Claims, 4 Drawing Sheets

COMBINATION VEHICLE FLASHER HAVING FIRST AND SECOND FLASH RATES AND DUTY RATES

BACKGROUND OF THE INVENTION

The present invention relates to electronic flashers for vehicles. More particularly, the present invention relates to a combination automobile flasher wherein flash rates and duty cycles are tightly controlled to provide a means of alerting a driver to lamp outage while satisfying motor vehicle regulations.

The U.S. Department of Transportation has promulgated Federal Motor Vehicle Safety Standards which require both turn signal and hazard warning flashers to operate within a specific range of flashes per minute and duty cycles. The Safety Standards also require a "significant change" in flash rate upon the outage of one or more lamps in the turn signal mode. The hazard warning flasher must operate at the same speed regardless of the number of operational lamps in order to maximize the visual perception of the flashing lamps.

Flashers can be of the thermal type, where a metal strip acts with a heater wire and ribbon to open and close a contact at a set interval or of the electronic type, wherein a capacitor and a resistor act together to turn the flasher "on" and "off." To satisfy the "significant change" requirement, thermal flashers usually operate in a "steady on" condition and electronic flashers double in flash rate when a lamp is lost in turn signal mode. In the past, automobile flasher systems have been constructed with two separate flashers. In these prior art systems, one flasher operates the automobile signal lamps in turn signal mode and the other flasher operates the lamps in hazard warning mode.

Automobile manufacturers have recently begun using combination flashers whereby one electronic flasher provides both turn and hazard warning signals. The units are designed to double in flash rate in order to indicate a lamp out in the turn signal mode. While the combination flasher saves space and cost, a conflict with the Safety Standards can arise when a combination flasher is used with a 6-lamp system in which three lamps on each side of the vehicle act as turn indicators. For example, in a 6-lamp system, if one or more lamps are lost on either side of the vehicle, the flash rate will double in the turn signal mode on that side. The hazard warning signal remains at the slower flash rate as required by the Safety Standards. However, in the event of a 4-lamp failure, the combination flasher will operate at a double flash rate in hazard warning mode because the combination flasher detects only a 2-lamp load. Because such an occurrence could cause a hazard warning flash rate and duty cycle outside the allowable limits, the condition would amount to a violation of the Safety Standards.

One solution to the forgoing problem is to add a terminal to the flasher that would indicate whether the vehicle is in turn signal or hazard warning mode. A special integrated circuit would be designed to monitor this terminal, and adjust the flash rate accordingly. While solving the problem, this solution is impractical since it would require an additional terminal on the flasher, an additional plug and wiring, and a new switch design.

There is a need therefore, for a combination flasher wherein the flash and duty cycles can be so tightly controlled that a significant change can be had in the flash rate while still meeting Federal Safety Regulations.

SUMMARY OF THE INVENTION

The present invention offers a combination flasher that can be used in a 6-lamp system without conflicting with the Motor Vehicle Safety Standards. Using integrated circuitry and close tolerance parts, a flasher's flash rate and duty cycle are very tightly controlled to provide a "lamp out" flash rate that is significantly different from the normal flash rate, but still within the allowable limits for normal flash rates.

When lamp outage occurs in turn signal mode, both the flash rate and the duty cycle will be significantly changed while still falling within the allowable rates. In the event of a 4-lamp failure, the hazard warning lamps will flash at the lamp-outage rate but, because the increased rate is within the allowable values, no violation of the Safety Standards will result. To further enhance the perception of a change, the flasher of the present invention will flash the lamps at the normal rate for the first three flashes, then change to the lamp-outage rate and duty cycle.

DESCRIPTION OF A PREFERRED EMBODIMENT

Figure 1:
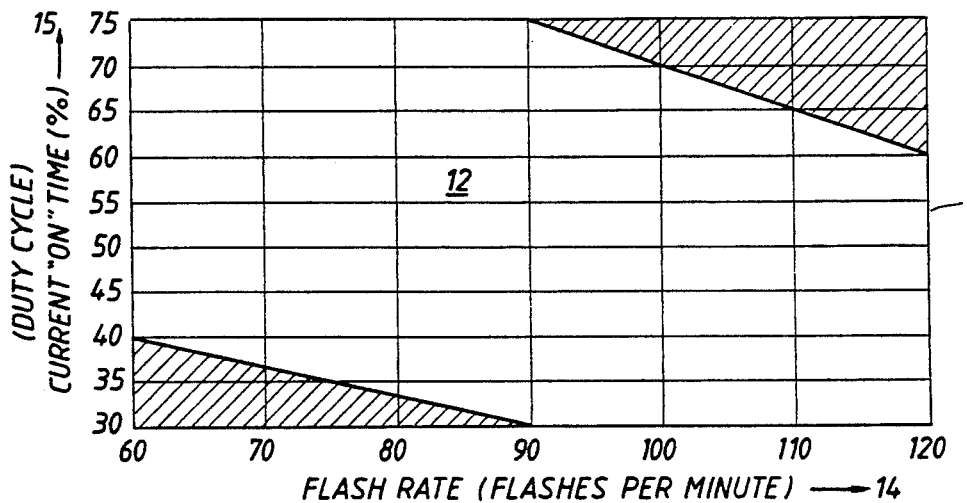
FIG. 1 is a polygon which depicts acceptable flash rate and duty cycles for automobile flashers.

The flasher that is the subject of the present invention can be better understood by reference to the figures. FIG. 1 is a polygon 10, the unshaded area 12 of which represents the acceptable operating limits of automobile flashers when all lamps are operational. The operating limits depicted by the polygon are set by the U.S. Department of Transportation. Along the horizontal axis 14 of the polygon, flash rate is measured in "flashes per minute." The vertical axis 15 measures the duty cycle of the flashers or the percentage of time in each cycle that the lamp is actually lit. To satisfy the "significant change" requirement, the flash rate is allowed to be outside of the polygon in the event of a lamp outage in turn signal mode. However, the flash rate in hazard warning mode must always be within the polygon regardless of the number of operational lamps. To prevent the possibility of an unacceptable flash rate in hazard warning mode when a combination flasher is in use with a 6-lamp system, two high-tolerance flash rates and duty cycle combinations are provided, both of which fall within the polygon.

Figure 2:
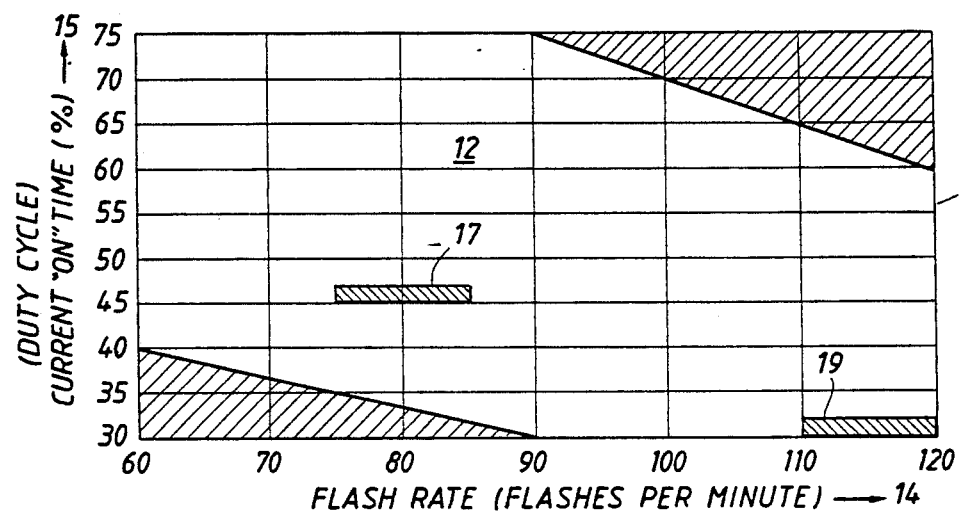
FIG. 2 is a polygon depicting the flash rates and duty cycles attainable with the present flasher system.

FIG. 2 depicts the polygon with the high tolerance flash ranges obtained by the present invention shown as shaded rectangles. Rectangle 17 is the normal flash rate and represents a rate of between 75 to 85 flashes per minute with a duty cycle of between 45 to 47%. Rectangle 19 is the "lamp out" flash rate and falls within a range of 110 to 120 flashes per minute and a 30 to 32% duty cycle. The "lamp-out" flash rate 19, while significantly different than the normal rate 17, still falls within the rectangle 10.

Figure 3A:
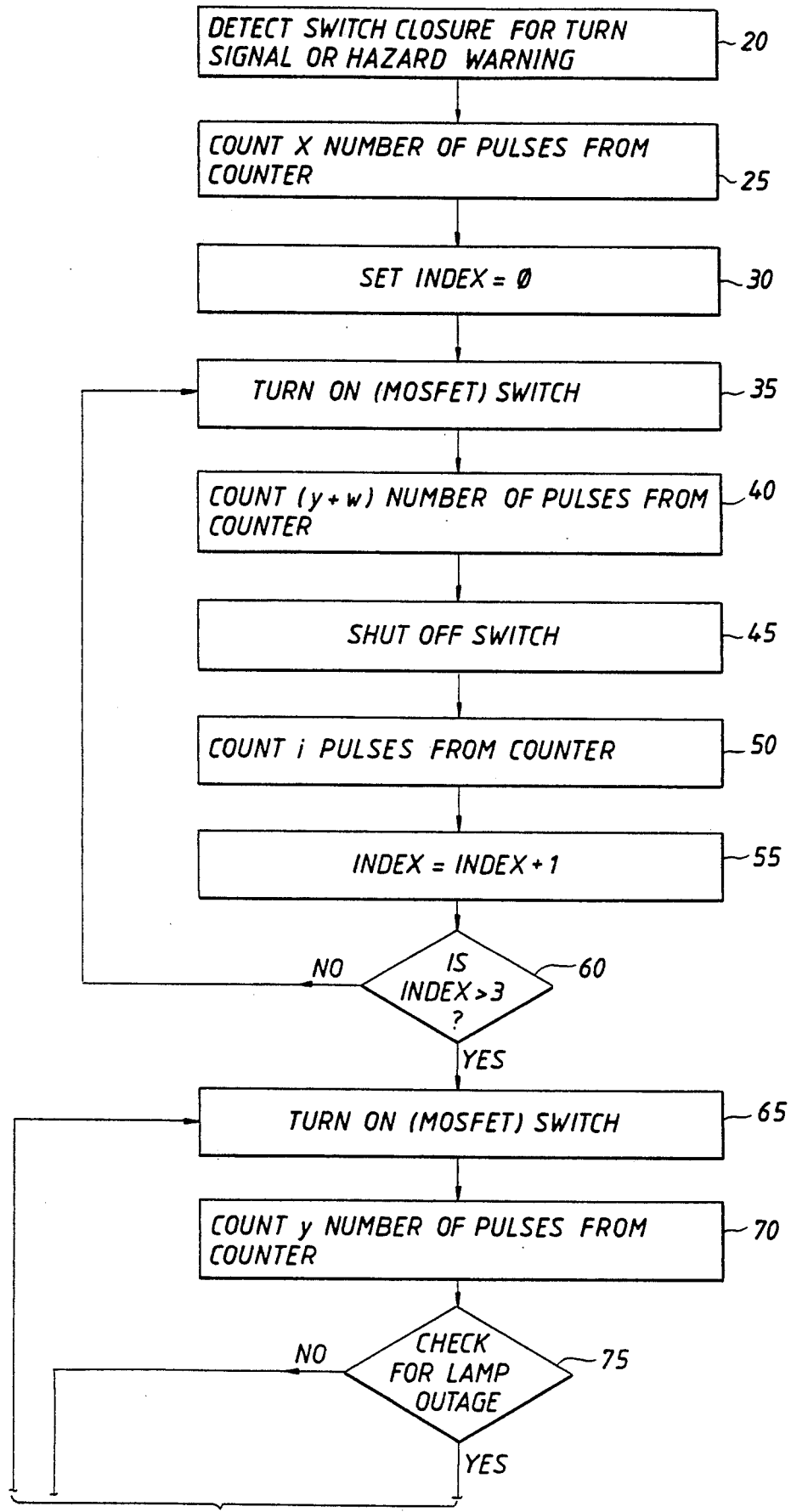
FIG. 3A and 3B are a flow chart depicting the logic and operation of the flasher system that is the subject of the present invention.
Figure 3B:
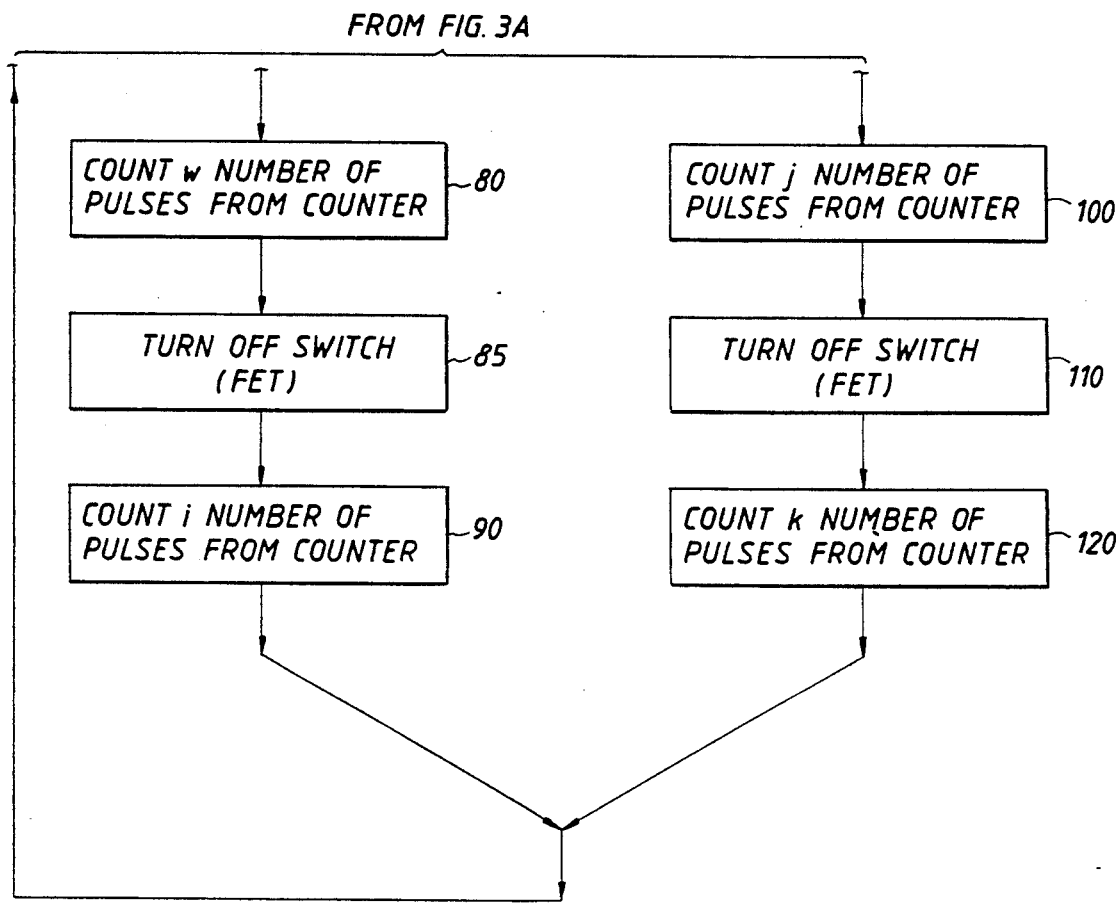

FIG. 3A and 3B make up a flow chart that describes the logic used in the flasher circuit of the present invention:

As depicted at the bottom 18 of FIG. 3B, pulses are counted by the integrated circuit to determine the flash rates in each mode. In the sequence depicted, the lamps are illuminated in a normal cycle for a period of "y+w" and the lamps are "off" for a period of "i". The duty cycle in the normal mode can be expressed as: "(y+w)/i." The lamp-out flash rate consists of an "on" period of "y+j" and an "off" period of "k" making the duty cycle expression in the lamp-out mode: "(y+j)/k."

As depicted in FIG. 3A, the sequence of operations begins at (20) when the turn signal or hazard warning indicator is manipulated, closing the flasher switch. The integrated circuit then counts "x" number of pulses while the system power is generated (25). Thereafter, an index is set to "0" (30). The index feature allows the flasher to flash at the normal rate 3 times before going to the lamp-out mode, thus increasing the significance of the between regular and "lamp-out" mode.

After the index has been set to "0" the flasher switch, in this case a MOSFET is turned on (35), illuminating the lamps. With the lamps on, the counter in the integrated circuit counts "y+w" pulses (40) and thereafter switches the MOSFET off (45). The counter then measures "i" pulses (50) and the index is set at "index+1"(55). After the index is increased the system checks the index for a value greater than "3" (60). If the value is not greater than "3," the system repeats steps (35) through (55) and again checks the index number.

If the index is greater than "3," the system turns on the MOSFET (65) illuminating the lamps. Thereafter, the system counts "y" pulses (70) and checks for lamp outage (75). If no lamp outage is detected, the system counts another "w" pulses (80, FIG. 3B) to complete the time period the lamp is on and then turns off the switch (85). The counter then measures "i" pulses (90) to complete a normal duty cycle.

If the system, when checking for lamp outage (75), finds that either four or more lamps are inoperable in hazard warning mode or that one or more lamps is inoperable on a side in turn signal mode on that side, the counter will measure "j" pulses (100) before turning off the switch (110). The result is a different "on" time for the flasher because "j" has a different value than "w". Additionally, in the lamp out mode, the counter will count "k" pulses to measure the length of time that the lamp is off. A cycle is thus completed in the lamp out mode. As depicted by the return arrow (120), the flasher will continue operating and checking for lamp outage during each cycle.

Although not depicted in the flow chart, those skilled in the art will appreciate that the system can include a short circuit check before each cycle. If a short circuit is detected, the entire system is shut off until it is reset.

Figure 4:
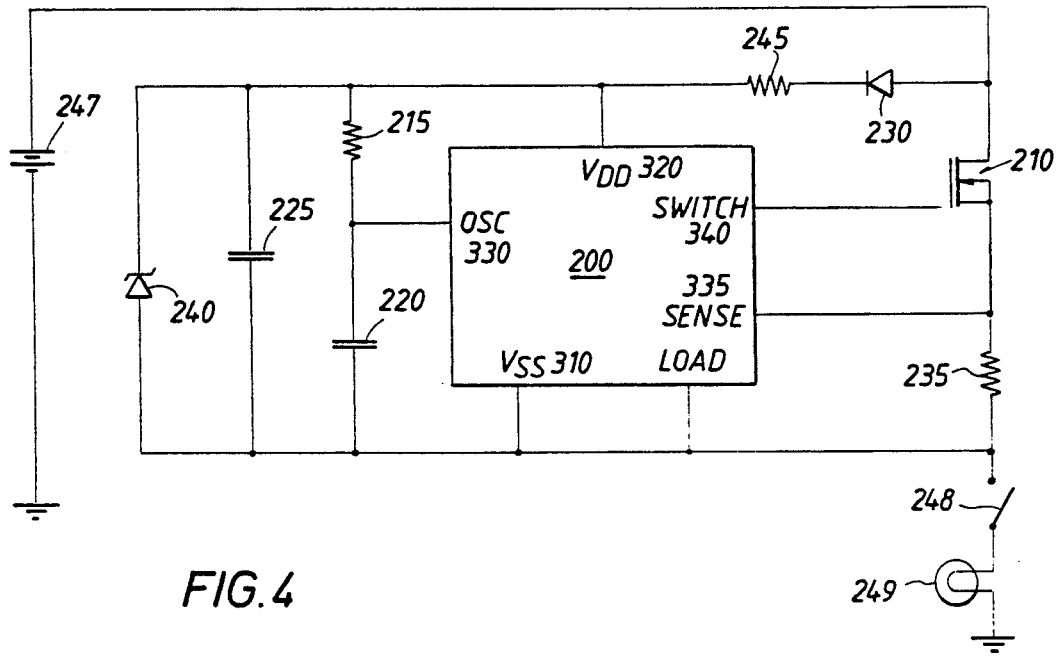
FIG. 4 is a schematic of an electronic circuit that depicts the external circuit of the present invention.
Figure 5:
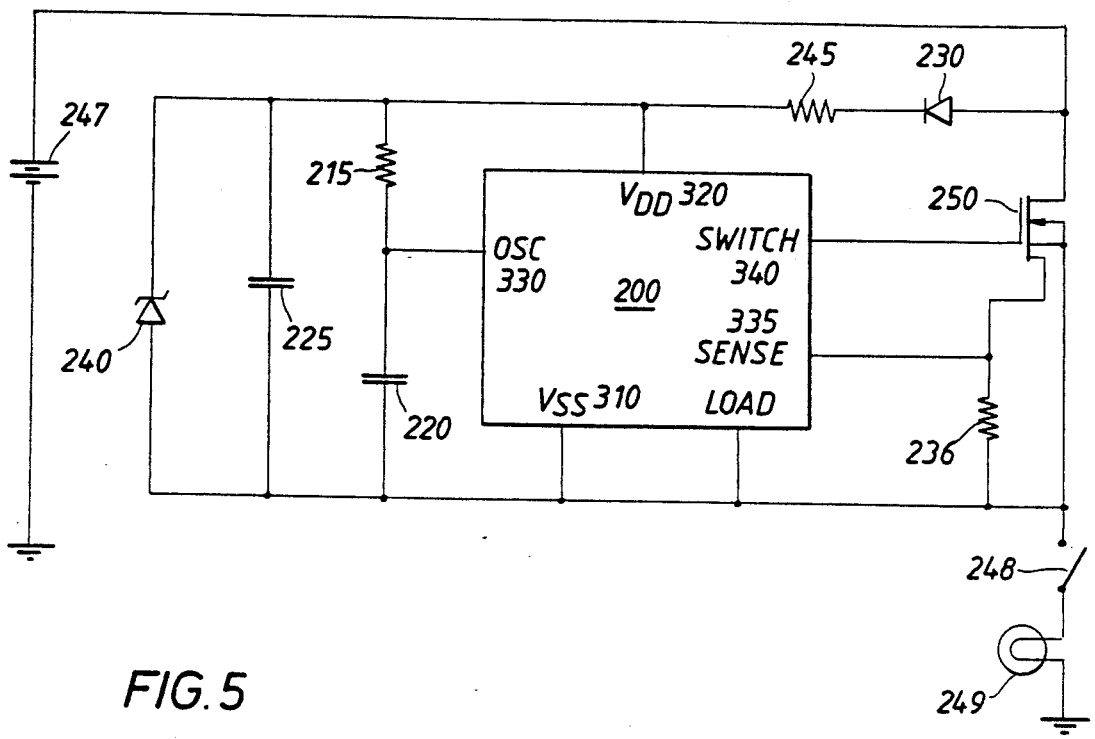
FIG. 5 is a schematic depicting a second embodiment of the external circuit.
Figure 6:
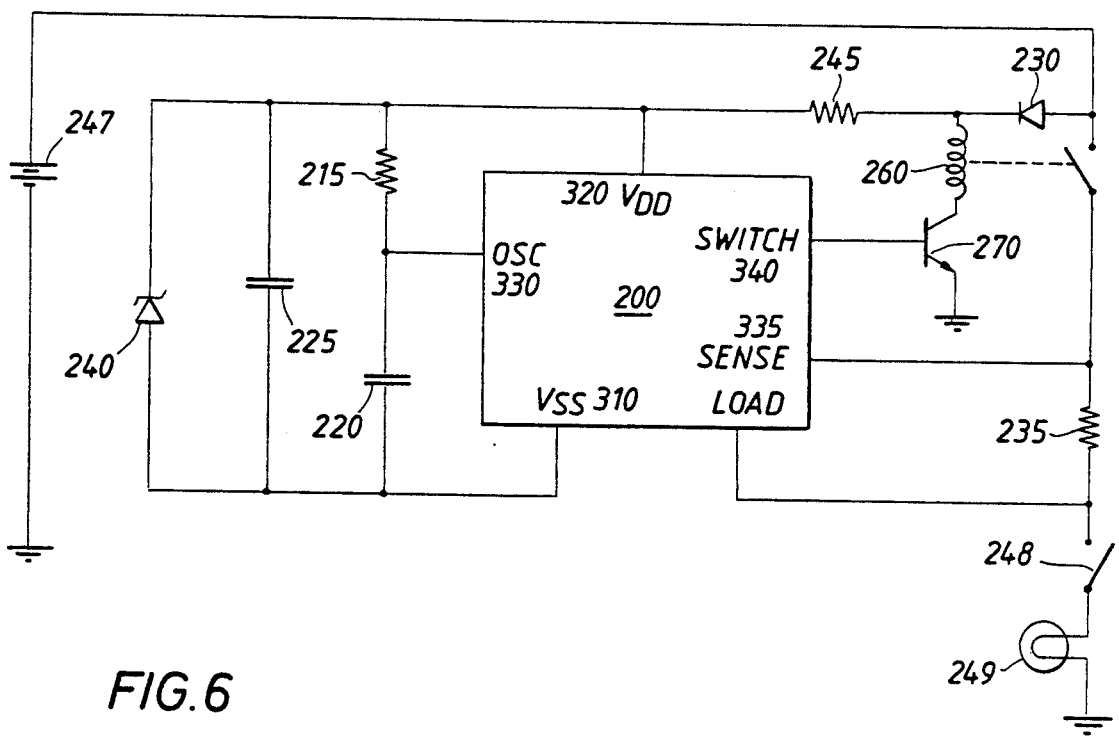
FIG. 6 is a schematic depicting a third embodiment of the external circuit.

The integrated circuit (IC) 200 used in the present system is of the type currently available and familiar to those skilled in the art. Typically, the IC will include control logic to provide programmed decisions; an oscillator 330, functioning with a capacitor 220 and resistor 215 in the external circuit to generate a pulse chain; a sense monitor 335 which measures current and provides information on the number of operational lamps; and a switch driver 340 which turns on the switch 210 in the external circuit. The IC 200 is depicted in FIGS. 4-6 and includes voltages Vss 310 (IC virtual ground) and Vdd 320 (IC power input). The IC will provide close tolerance flash rates which can be held from between −40 and 85 degrees centigrade, ambient temperature and 8 to 16 volts DC battery voltage.

The external circuit, which provides power to the lamps is controlled by the IC and can include many different arrangements of components. Three possible external circuits are shown in FIGS. 4-6. The circuit in FIG. 4 uses a MOSFET transistor. FIG. 5 utilizes a sensor MOSFET transistor and FIG. 6 uses an electromechanical relay.

FIG. 4 depicts the flasher system used with a solid state, two terminal, transistorized, N-channel MOSFET switch 210, wherein one terminal goes to the battery 247 and the other terminal goes to the load 249 which consists of a plurality of lamps. While the switch of the preferred embodiment is a two-term switch, it will be understood that the present invention could be used with a switch having any number of terminals and the invention is not limited to use with a two-terminal switch. The circuit also includes an oscillator resistor 215 which controls the rate at which current charges the oscillator capacitor 220. The capacitor 220 and resistor 215 operate in combination with oscillator 330 to produce an electronic pulse chain. A bootstrap/filter capacitor 225 supplies the flasher system with current and a bootstrap/reverse current protection diode 230 which protects the system from reverse voltages. The circuit also includes a shunt resistor 235 which allows measurement of the lamp current by converting the current to a voltage which is then measured by the IC 200. Also depicted, is an optional zener diode 240 which provides over-current protection and a current limiting resistor 245. A 12 volt source 247 is depicted along with the operator-manipulated turn signal switch 248 and one of several lamps 249 electrically connected in parallel.

FIG. 5 depicts the same circuitry as FIG. 4 with an N-channel sensor MOSFET 250 used in place of MOSFET 210. All components of the sensor MOSFET circuit are identical to those of the MOSFET circuit described above with the addition of a sense resistor 236 in place of the shunt resistor 235.

FIG. 6 depicts the external circuit using a 3-terminal, electro-mechanical relay. The relay includes a relay coil 260, a shunt resistor 235 and a driver transistor 270. All other components are the same as in FIGS. 4 and 5.

As demonstrated by the forgoing discussion and figures, the present invention solves the problems associated with combination flashers used in 6-lamp systems by providing two, close tolerance flash rates and duty cycles, both of which satisfy the Motor Vehicle Safety Standards.

While the combination flasher and method of using the flasher has been described herein by reference to its preferred embodiment, it will be understood that other various embodiments of the device and method of the present invention may be possible by reference to the specification and the appended claims. Such additional embodiments shall be included within the scope of the appended claims.

We claim:

1. A combination flasher system for controlling six lamps used during operation of a hazard warning mode and a directional signalling mode of a vehicle, wherein three of the lamps are selectively energized in a first directional mode at a first flash rate and a first duty cycle, the other three of the lamps are selectively energized in a second directional mode at the first flash rate and first duty cycle, and all six lamps are energized during the hazard warning mode at the first flash rate and duty cycle, the improvement comprising:

- a duty cycle and flash rate control circuit which causes the lamps to become energized a plurality of times at the first flash rate and first duty cycle and thereafter, energized at a second flash rate and second duty cycle when any one of the six lamps fail to operate upon energization thereof in the directional modes and when any four of the six lamps fail to operate upon energization thereof in the hazard warning mode;
- said control circuit including an integrated circuit having;
  - a control logic portion performing programmed decisions;
  - an oscillator which controls the first and second flash rates and first and second duty cycles;
  - a sense monitor which measures the electrical load being drawn by the lamps in the directional and hazard warning modes to determine when the load changes in response to a non-functional bulb; and
  - a switch driver;
- wherein said control circuit further includes an external control circuit interconnected to and controlled by said integrated circuit, said external circuit including:
  - an oscillator capacitor, said capacitor constructed and arranged to charge at a set rate;
  - an oscillator resistor, said resistor constructed and arranged to control the rate at which current charges said oscillator capacitor;
  - a bootstrap-filter capacitor, said bootstrap-filter capacitor constructed and arranged to supply said external circuit with power while said lamps are energized;
  - a reverse current protection diode, said protection diode constructed and arranged to protect said integrated circuit from reverse currents;
  - a flasher switch energized by said switch driver, said flasher switch controlling the current to said lamps via a control signal from said integrated circuit; and
  - a sense resistor, said sense resistor allowing measurement of a lamp current by converting said current to a voltage measured by said integrated circuit.

2. The flasher system as defined in claim 1, wherein: said first and second flash rates are between 60 and 120 flashes per minute and said first and second duty cycles are between 30 and 75%.

3. The flasher system as defined in claim 2, wherein: said first flash rate is lower than said second flash rate and said first duty cycle is higher than said second duty cycle.

4. The flasher system as defined in claim 3, wherein: said first flash rate is 75 to 85 flashes per minute and said first duty cycle is 45 to 47%;
said second flash rate is 110 to 120 flashes per minute and said second duty cycle is 30 to 32%.

5. A combination flasher system including six lamps and a plurality of conductors electrically connecting said lamps to a current source, said flasher system for controlling said six lamps used during operation of a hazard warning mode and a directional signalling mode of a vehicle, wherein three of the lamps are selectively energized in a first directional mode at a first flash rate and first duty cycle, the other three of the lamps are selectively energized in a second directional mode at the first rate and first duty cycle, and all six lamps are energized during the hazard warning mode at the first rate and duty cycle, the improvement comprising:

- a duty cycle and flash rate control circuit which causes the lamps to become energized a plurality of times at the first flash rate and first duty cycle and thereafter, energized at a second flash rate and second duty cycle when any one of the six lamps fail to operate upon energization thereof in the directional modes and when any four of the six lamps fail to operate upon energization thereof in the hazard warning mode;
- said control circuit including an integrated circuit having;
  - a control logic portion performing programmed decisions;
  - an oscillator which controls the first and second flash rates and first and second duty cycles;
  - a sense monitor which measures the electrical load being drawn by the lamps in the directional and hazard warning modes to determine when the load changes in response to a non-functional bulb; and a switch driver;
- wherein said control circuit further includes an external control circuit interconnected to and controlled by said integrated circuit, said external circuit including:
  - an oscillator capacitor, said capacitor constructed and arranged to charge at a set rate;
  - an oscillator resistor, said resistor constructed and arranged to control the rate at which current charges said oscillator capacitor;
  - a bootstrap-filter capacitor, said bootstrap-filter capacitor constructed and arranged to supply said external circuit with power while said lamps are energized;
  - a reverse current protection diode, said protection diode constructed and arranged to protect said integrated circuit from reverse currents;
  - a flasher energized by said switch driver, said flasher system controlling the current to said lamps via a control signal from said integrated circuit; and
  - a sense resistor, said sense resistor allowing measurement of a lamp current by converting said current to a voltage measured by said integrated circuit.

* * * * *